United States Patent
Biedermann et al.

(10) Patent No.: US 6,490,447 B2
(45) Date of Patent: *Dec. 3, 2002

(54) CORDLESS TELECOMMUNICATIONS SYSTEM

(75) Inventors: Rolf Biedermann, Hamminkeln; Josef Baumeister, Borken, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,690

(22) PCT Filed: Sep. 9, 1996

(86) PCT No.: PCT/DE96/01690

§ 371 (c)(1), (2), (4) Date: Mar. 26, 1998

(87) PCT Pub. No.: WO97/13384

PCT Pub. Date: Apr. 10, 1997

(65) Prior Publication Data

US 2001/0011017 A1 Aug. 2, 2001

(30) Foreign Application Priority Data

Sep. 29, 1995 (DE) .......................................... 195 36 530

(51) Int. Cl.[7] .................................................. H04Q 7/20

(52) U.S. Cl. ....................... 455/426; 455/561; 455/518; 455/552

(58) Field of Search ................................. 455/426, 552, 455/575, 518, 519, 520, 509, 517, 553, 465, 561, 555

(56) References Cited

U.S. PATENT DOCUMENTS

| 4,768,218 | A | * | 8/1988 | Yorita .......................... 455/463 |
| 5,040,205 | A | * | 8/1991 | Kunihiro ..................... 455/463 |
| 5,179,721 | A | * | 1/1993 | Comroe et al. ............. 455/552 |
| 5,255,308 | A | * | 10/1993 | Hashimoto et al. ......... 455/463 |
| 5,371,898 | A | * | 12/1994 | Grube et al. ................. 455/552 |
| 5,375,254 | A | * | 12/1994 | Owen ......................... 455/54.1 |

(List continued on next page.)

FOREIGN PATENT DOCUMENTS

DE     195 36 530 C1     9/1995

OTHER PUBLICATIONS

Olanders, Peter, DECT Standardization: Status and future activities, International Symposium on Personal Indoor and Mobile Radio Communications and ICCC Regional Meeting on Wireless Computer Networks, p. 1064–1069, Sep. 1994.*

(List continued on next page.)

*Primary Examiner*—Nay Maung
*Assistant Examiner*—Joy K. Contee
(74) *Attorney, Agent, or Firm*—Bell, Boyd & Lloyd LLC

(57) ABSTRACT

In a cordless telecommunications system with assured interoperability of cordless telecommunications applications, in particular a GAP-specific DECT system, having a cordless base station and having cordless mobile parts which are capable of telecommunication with the cordless base station via a radio interface wherein the number of mobile points exceeds the number of telecommunications channels which are available in parallel at the cordless base station, collective/group calls being possible while the interoperability of the cordless telecommunications applications remains ensured, mixed operation is implemented including a connection-based virtual-collective/group call and a connectionless collective/group call.

3 Claims, 3 Drawing Sheets

U.S. PATENT DOCUMENTS

| | | | | |
|---|---|---|---|---|
| 5,598,407 A | * | 1/1997 | Bud et al. | 370/330 |
| 5,666,398 A | * | 9/1997 | Schiffel et al. | 370/29 |
| 5,799,250 A | * | 8/1998 | Veloso et al. | 455/422 |
| 5,812,951 A | * | 9/1998 | Ganesan et al. | 455/445 |
| 5,878,277 A | * | 3/1999 | Ohta | 395/857 |
| 5,901,342 A | * | 5/1999 | Heiskari et al. | 455/11.1 |

OTHER PUBLICATIONS

Campbell et al., DCT 1800– A DECT Solution for Radio Access Application, Ericsson Review, p. 84–92, Jan. 1994.*

DCT 1800—A DECT Solution for Radio Access Application by Guy M. Campbell et al., pp. 84–92.

DECT standardisation—Status and future activities pags 1064–1069.

ProDECT 1.0 software package for DECT home phones by Bernhard Kugle, pp. 32–37.

DECT wird mit GAP herstellerunabhangig pp. 38–41.

Time Division Multiple Access Methods for Wireless Personal Communications by David D. Falconer et al., p. 50–57.

Struktur des DECT standards pp. 23–29.

Digitaler Komfort fur schnurlose Telekommunikation pp. 26–27.

DECT, a universal cordless access system, by R.J. Mulder pp. 68–73.

Hochoptimierte ICs fur DECT schnurlos telefone, pp. 215–218.

* cited by examiner

CORDLESS TELECOMMUNICATIONS SYSTEM

BACKGROUND OF THE INVENTION

1. Field of the Invention

The present invention relates to a cordless telecommunications system with assured interoperability of cordless telecommunications applications and, more particularly, a GAP-specific DECT system with such assured interoperability.

2. Description of the Prior Art

In information systems having a message transmission path between a message source and a message sink, transmitting and receiving devices are used for message processing and transmission. In such devices:

(1) the message processing and message transmission may take place in a preferred transmission direction (simplex operation) or in both transmission directions (duplex operation),
(2) the message processing is analog or digital, and
(3) the message transmission via the long-distance transmission path takes place without wires based on various message transmission methods, such as FDMA (Frequency Division Multiple Access), TDMA (Time Division Multiple Access) and/or CDMA (Code Division Multiple Access), for example in accordance with radio standards DECT, GSM, WACS or PACS, IS-54, PHS, PDC etc. (see IEEE Communications Magazine, January 1995 pages 50 to 57; D. D. Falconer et al: "Time Division Multiple Access Methods for Wireless Personal Communications").

"Message" is a generic term which covers both the sense content (information) and the physical representation (signal). Despite a message having the same sense content, that is to say same information, different signal forms may occur. Thus, for example, a message relating to a subject may be transmitted:

(1) in the form of an image,
(2) as the spoken word,
(3) as the written word, or
(4) as an encrypted word or image.

The type of transmission for (1) . . . (3) is normally characterized by continuous (analog) signals, while, in the case of the type of transmission for (4), signals are normally discontinuous (e.g. pulses, digital signals).

Cordless telecommunications systems with assured interoperability of cordless telecommunications applications are DECT systems (Digital Enhanced (previously: European) Cordless Telecommunication; see (1): Nachrichtentechnik Elektronik 42 [Telecommunications electronics] (1992, Jan./Feb.), No. 1, Berlin, Del.; U. Pilger: "Struktur des DECT-Standards", [Structure of the DECT Standard], pages 23 to 29; (2): telcom report 16 (1993), Issue 1, J. H. Koch: "Digitaler Komfort für schnurlose Telekommunikation, DECT-Standard eröffnet neue Nutzungsgebiete", [digital convenience for cordless telecommunication, DECT Standard opens up new fields of use], pages 26 and 27; (3): Philips Telecommunication Review, Vol. 49, No. 3, Sept. 1991; R. J. Mulder: DECT Universal Cordless Access System", pages 68 to 73), for which a CAP Standard (Generic Access Profile; see ETI-Publication prETS 300 444, April 1995, Final Draft, ETSI, FR) has been defined and agreed in order to ensure interoperability of cordless telecommunications applications on the basis of the DECT Standard.

According to the DECT Standard and on the basis of the illustration in FIG. 1, a maximum of 12 links using the TDMA/FDMA/TDD method (Time Division Multiple Access/Frequency Division Multiple Access/Time Division Duplex) may be set up in parallel to DECT mobile parts MT1 . . . MT12 at a DECT base station BS via a DECT radio interface designed for the frequency band between 1.88 and 1.90 GHz. The maximum number of 12 links results from a number k of time slots or telecommunications channels ($k \leq 12$) available for duplex operation of a DECT system. The links may in this case be internal and/or external. In the case of an internal link, two mobile parts registered at the base station BS, for example the mobile part MT2 and the mobile part MT3, may communicate with one another. In order to set up an external link, the base station BS is connected to a telecommunications network TKN via, for example, a telecommunications line unit TAE or a private branch exchange NStA. In the case of an external link, a mobile part, for example the mobile part MT1, can be used to communicate with a subscriber in the telecommunications network TKN via the base station BS, the telecommunications line unit ATE or the private branch exchange NStA.

If as in the case of the Gigaset 951 (Siemens cordless telephone, see telcom report 16, (1993), Issue 1, pages 26 and 27)—the base station BS has only one connection to the telecommunications line unit TAE or to the private branch exchange NStA, then only one external link can be set up. If, as in the case of the Gigaset 952 (Siemens cordless telephone; see telcom report 16, (1993), Issue 1, pages 26 and 27), the base station BS has two connections to a telecommunications network TKN, then, in addition to the external link to the mobile part MT1, another external link is possible from a lined-based telecommunications terminal TKE which is connected to the base station BS. In this case, it is also feasible for a second mobile part, for example the mobile part MT12, to use the second connection for an external link, instead of the telecommunications terminal TKE. While the mobile parts MT1 . . . MT12 are operated from a battery or a rechargeable battery, the base station BS which is designed as a small cordless exchange is connected to a mains power supply SPN via a mains interface NAG.

Referring to the simple DECT system according to FIG. 1, which is preferably used for the private domain DECT system applications now available, for example in the public local domain, a number m of mobile parts, where m>k, are connected to a base station via the DECT radio interface.

The "m" mobile parts, wherein, for example, m=20, may include a number m1 of DECT mobile parts D-MT and/or a number m2 of GAP mobile parts G-MT (See FIG. 2), subject to the following condition;

m=m1+m2, in which case m1 $\in N_0$ where $\{m1=0\} \notin N_0$ and m,m2 $\in N_1$ where $\{m,m2=0,1\} \notin N_1$ When the situation arises in such a DECT/GAP system in which a remote telecommunications subscriber signals from the telecommunications network TKN to a GAP base station G-BS (which may be designed, for example, as an antenna diversity base station) that the wishes to set up a telecommunications link to one of the mobile parts, the GAP base station G-BS must report this to the mobile parts, D-MT, G-MT allocated to it. This reporting takes place, for example, by the mobile parts D-MT, G-MT ringing (audible indication). Alternatively, other indication forms are also possible (for example visual indication).

On the basis of the GAP Standard, it is not possible for more GAP mobile parts G-MT to ring than the number of telecommunications channels k which are available via the GAP radio interface at the GAP base station G-BS. This is due to the fact that, based on the GAP Standard, ringing at the GAP mobile part G-MT is initiated only when a link has been set up between the GAP base station G-BS and the GAP mobile part G-MT via a message defined in the GAP Standard. This is a mandatory performance or service feature in the GAP Standard which must be supported by all GAP base stations G-BS and GAP mobile parts G-MT. This feature results in the individual GAP mobile parts G-MT allocated to the GAP base station G-BS being called more or less simultaneously (virtual-collective/group call; GAP call; connection-based call). If, in such a GAP system, the number of GAP mobile parts G-MT called is greater than the number of telecommunications channels k via the GAP radio interface available at the GAP base station G-BS (m2>k), then a maximum of one telecommunications channel is free at the GAP base station G-BS for the first "k" GAP mobile parts G-MT. No connection may be set up by the other GAP mobile parts G-MT by which ringing can be initiated.

ETSI currently defines a connectionless collective/group call (collective/group ringing), but does not comply with the GAP Standard. This means that a GAP mobile part on a base station, for example a DECT base station, which uses this connectionless collective/group call will not ring.

Based on the document Components 31 (1993), Issue 6, pages 215 to 218; S. Althammer, D. Brückmann: "Hochoptimierte IC's für DECT-Schnurlostelefone" [Highly optimized ICs for DECT cordless telephones], FIG. 3 shows the basic circuit design of the GAP base station G-BS according to FIG. 2. This include a radio section FKT, a signal processing device SVE having both a signal control section SST (which is designed as a time switch controller TSC with switching functions) and a signal conversion section SUT (which is designed as a CODEC and AD/DA converter), a clock generator TG, a microcontroller MIC, a line interface LSS to the telecommunications line unit TAE or to the private branch exchange NStA, and a power supply SVG. The microcontroller MIC contains, for example, a program module PGM in order to implement the connectionless collective/group call. The principle of the method of operation of the circuit design in conjunction with the mobile parts D-MT, G-MT is comparable with that of a DECT circuit design. The principle of the method of operation of the DECT circuit design is described, for example, in the document cited above.

SUMMARY OF THE INVENTION

An object of the invention present is to provide a cordless telecommunications system with assured interoperability of cordless telecommunications applications. In particular, such system is a GAP-specific DECT system (DECT/GAP system) having a cordless base station and cordless mobile parts which are capable of telecommunication with the cordless base station via a radio interface wherein the number of such parts exceeds the number of telecommunications channels which are available in parallel at the cordless base station. In addition a collective/group call is made possible while interoperability of the cordless telecommunications applications remains ensured.

The idea on which the present invention is based is for mixed operation of a connection-based virtual-collective/group call and a connectionless collective/group call to be implemented in a cordless telecommunications system (which processes and transmits messages—such as images, spoken words, written words, encrypted words or images) with assured interoperability of cordless telecommunications applications of the type mentioned and explained initially, for example a GAP-specific DECT system (DECT/GAP system). In this case, a cordless mobile part [lacuna] is configured in the cordless base station, to which cordless mobile part a connection-based virtual-collective/group call (GAP call; connection-based call) goes and to which cordless mobile part a connectionless collective/group call (connectionless call) goes. To this end, the cordless base station has means which are appropriate designed for this purpose; for controlling connections for the cordless mobile parts. These means comprise, for example, a microprocessor which is in the cordless base station and has a program module designed for call control.

In an embodiment of the present invention, a GAP-specific DECT cordless telecommunications system with assured interoperability of cordless telecommunications applications is provided which includes a cordless base station having a quantity k of parallel telecommunication channels, a quantity m1 of first cordless mobile parts capable of communication with the base station and which respond and react to connectionless call messages, a quantity m2 of second cordless mobile parts capable of communication with the base station and which respond and react to connection-based call messages, a quantity m3 of third cordless mobile parts capable of communication with the base station and which respond and react to both connection-based call messages and connectionless call messages, wherein m1+m2+m3=m total cordless mobile parts and m is >k, and a controller in the base station for controlling connections between the base station and the total cordless mobile parts wherein the total cordless mobile parts send a number j connection-based call messages and a number l connectionless call messages and wherein (1) m=m1+m2+m3, in which case m1, m3 $\in$ N$_0$ where n=0,1,2, . . . and m,m$^2$ $\in$ N$_1$=1,2,3, . . .

(2) m$^2 \leq$k−1, in which case k $\in$ N$_2$ where n=2,3, . . .

(3) j$\leq$k−1, in which case k $\in$ N$_2$ where n=2,3, . . .

In an embodiment, the number k of telecommunications channels available in parallel at the cordless base station is equal to 12.

In an embodiment, the number k of telecommunications channels available in parallel at the cordless base station is equal to 6.

Additional features and advantages of the present invention are described in, and will be apparent from, the Detailed Description of the Presently Preferred Embodiments and from the Drawings.

DETAILED DESCRIPTION OF THE PREFERRED EMBODIMENTS

Advantageous developments of the invention are specified in the dependent claims.

An exemplary embodiment of the invention will be explained with reference to FIG. 4.

Figure 1:
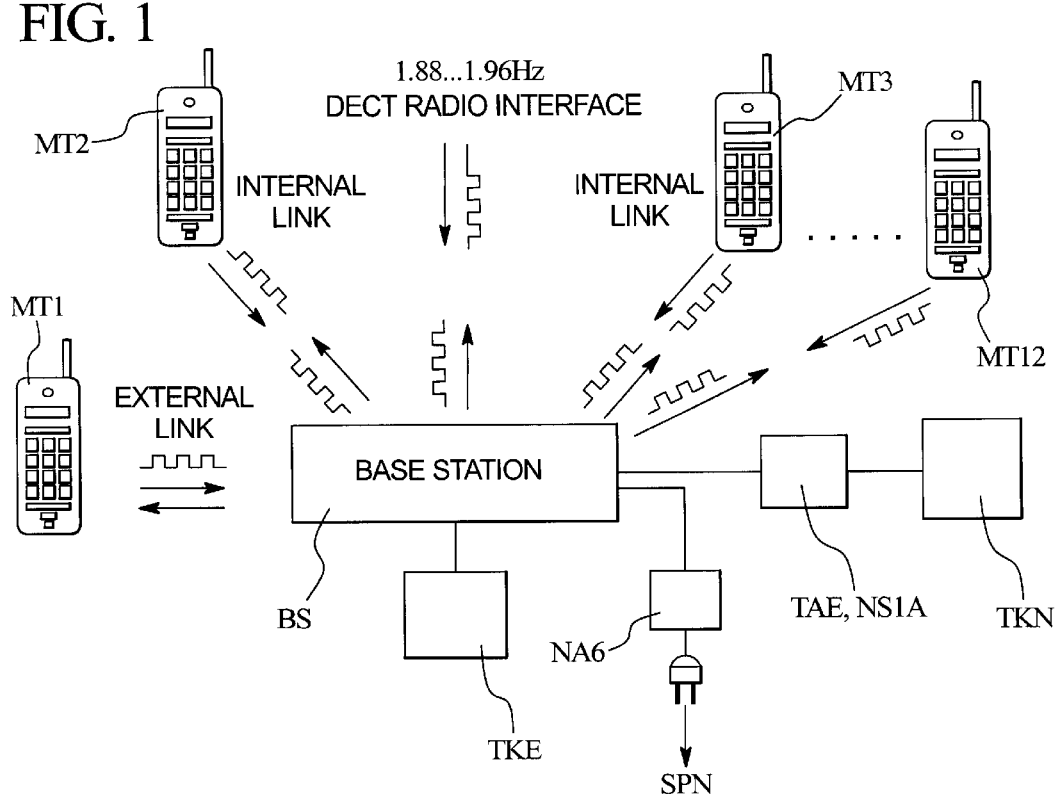
FIG. 1 shows a functional diagram of a known DECT telecommunications system.
Figure 2:
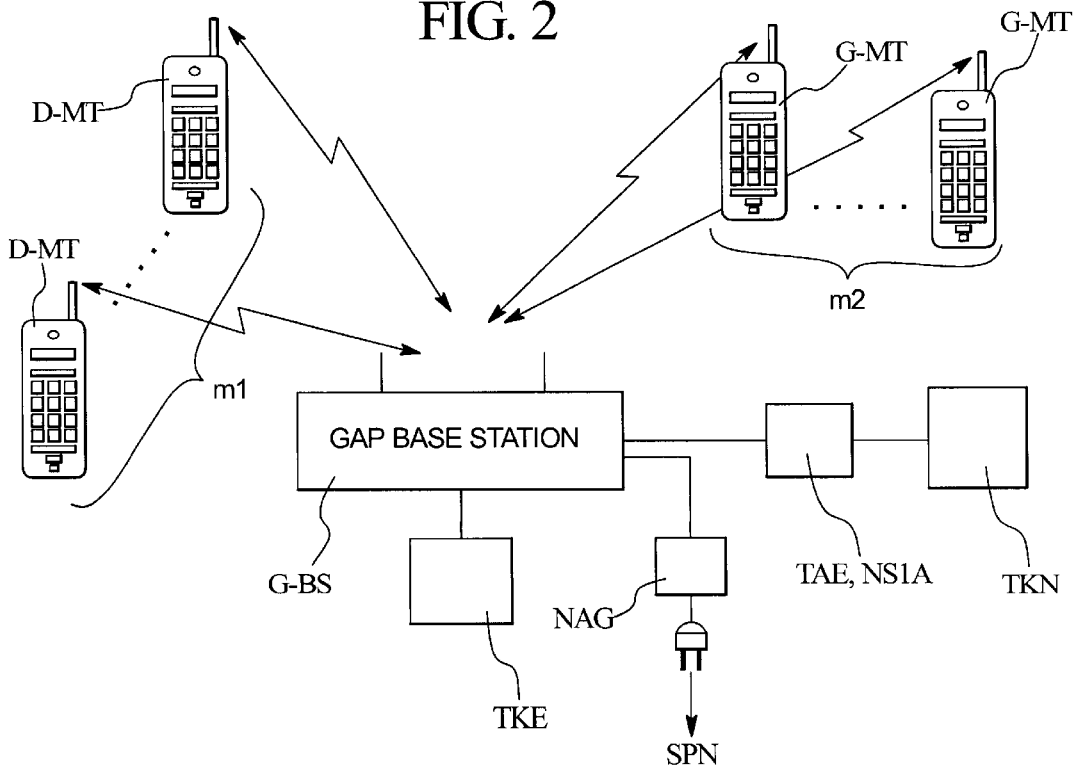
FIG. 2 shows the system of FIG. 1 wherein the mobile parts are defined as either DECT mobile parts of GAP mobile parts.
Figure 3:
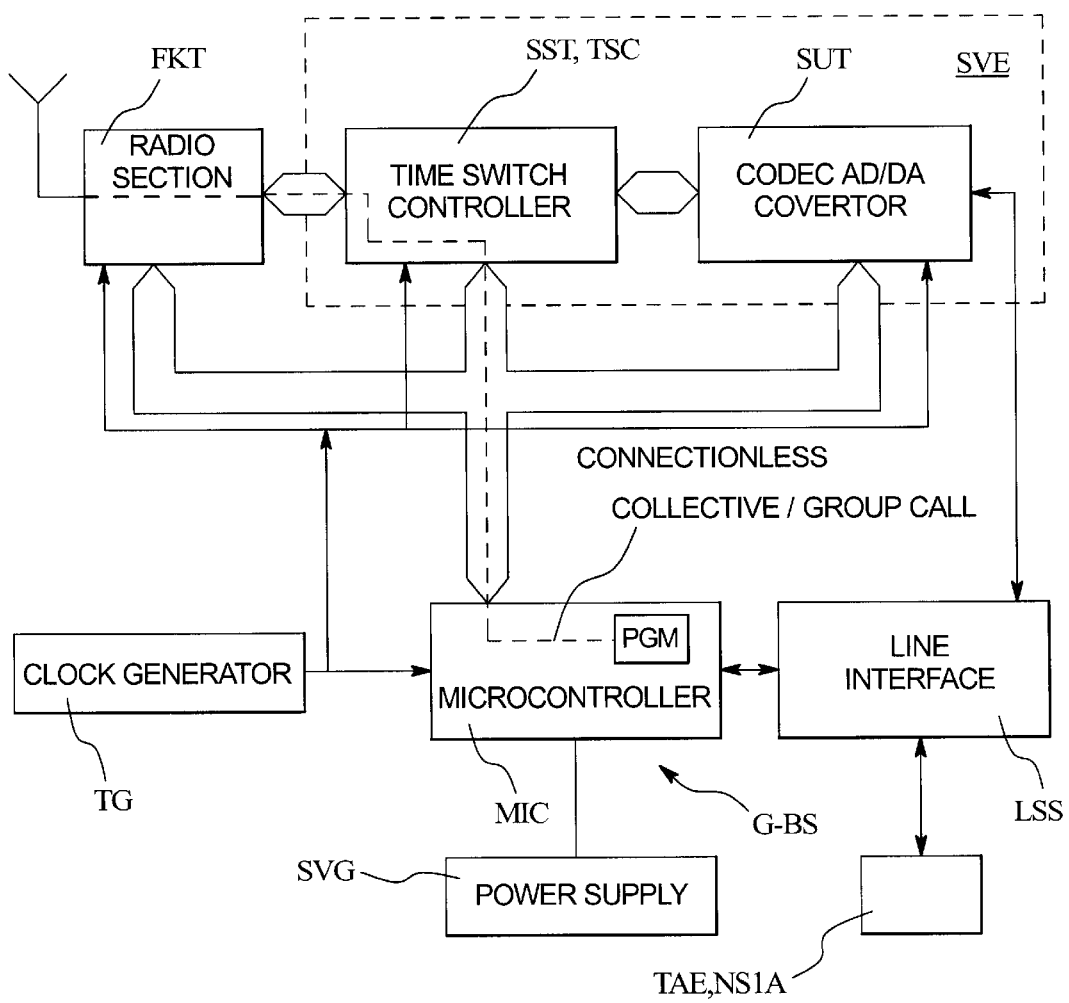
FIG. 3 shows the basic circuit design of the GAP base station of FIG. 2.
Figure 4:
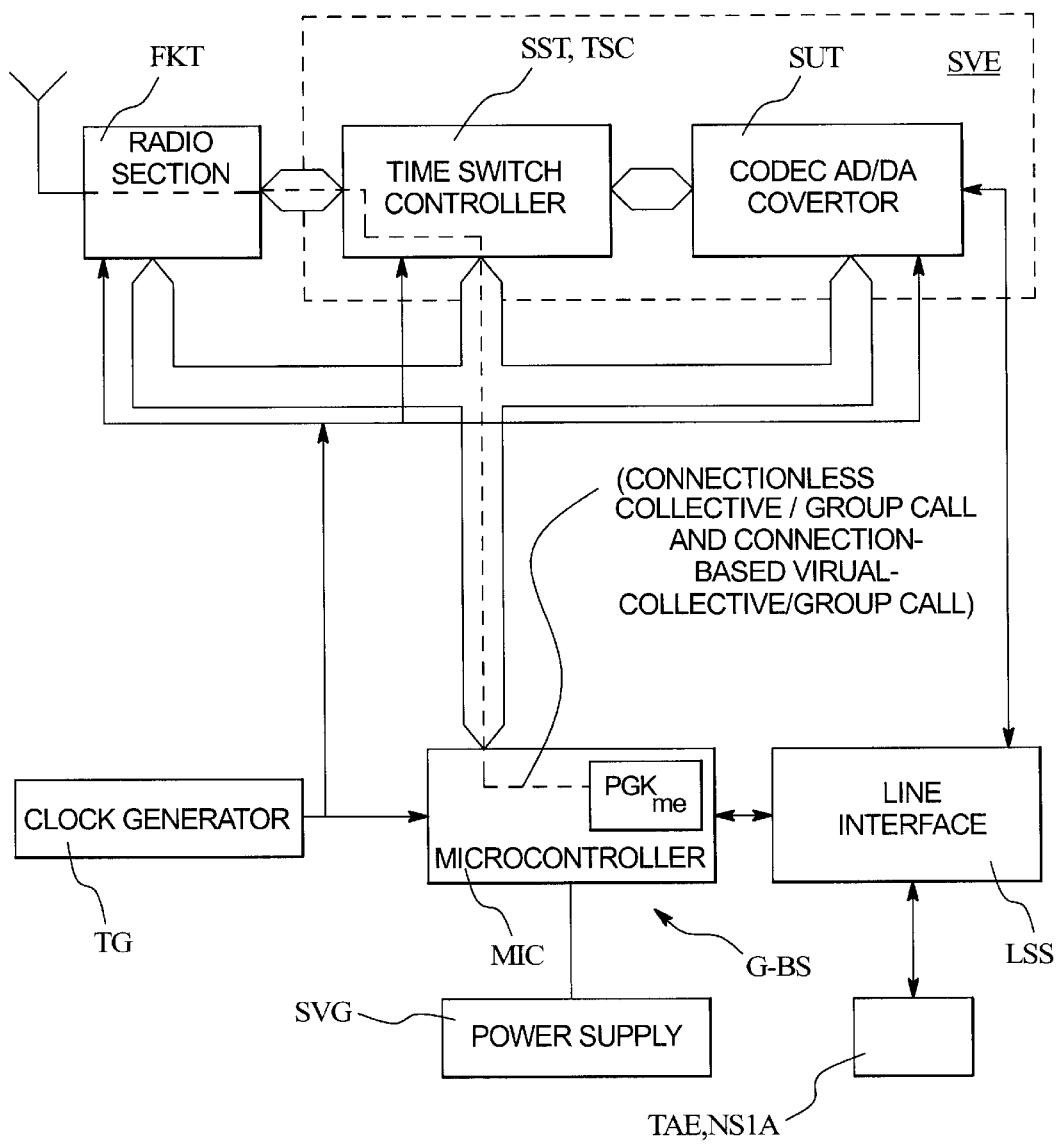
FIG. 4 shows a modified circuit design of the GAP base station of FIG. 2 in accordance with the teachings of the present invention.

Based on FIG. 3, FIG. 4 shows a modified circuit design of the GAP base station G-BS according to FIG. 2 in accordance with the teachings of the present invention. Using this circuit design of the GAP base station G-BS, it is still possible to implement, on the one hand, the connectionless collective/group call intended for the DECT mobile parts D-MT and, on the other hand, the connection-based virtual-collective/group call intended for the GAP mobile parts G-MT, for the DECT mobile parts D-MT and/or GAP mobile parts G-MT allocated to the GAP base station G-BS. For this purpose, the microcontroller MIC according to FIG. 3 contains an expanded program module $PGM_{me}$, modified from the program module PGM. This program module $PGM_{me}$ is used to define which of the mobile parts D-MT, G-MT are to be allocated to the GAP base station G-BS as a connectionless collective/group call or, respectively, as a connection-based virtual-collective/group call. The program module $PGM_{me}$ means that the GAP base station G-BS is designed for both call options (mixed operation).

In FIG. 2, it as assumed that identification means, (implemented in the mobile parts D-MT, G-MT) for the call options of the GAP base station G-BS are respectively designed only for the call option specific to the mobile part (mono operation). However, it is also possible for, for example, a number m3 of DECT/GAP mobile parts D/G-MT to be connected by telecommunication, via the GAP interface, to the GAP base station G-BS. In terms of the identification means, these DECT/GAP mobile parts D/G-MT are designed for both call options (dual operation; mixed operation). The condition placed on the explanation relating to FIG. 2 then becomes:

m=m1+m2+m3, in which case m1,m3 $\in N_0$ where n=0, 1,2, . . . and m,m$^2$ $\in N_1$ where n=1,2,3, . . .

The number of mobile parts G-MT, D/G-MT which understand only the connection-based virtual-collective/group call (GAP call) results from the number "k" of available telecommunications channels at the GAP base station G-BS. For a mobile part D-MT, D/G-MT which has been called via the connectionless collective/group call to receive a call, a telecommunications channel (time slot) must be available at the GAP base station G-BS. In this case, for example, a number "i" of mobile parts D-MT, D/G-MT can be called via the connectionless collective/group call. As a result of the fact that at least one telecommunications channel must always be reserved for the connectionless collective/group call, a number "j" of mobile parts G-MT, D/G-MT called in accordance with the GAP Standard is less than the number of telecommunications channels (j<k).

Although the present invention has been described with reference to specific embodiments, those of skill in the art will recognize that changes may be made thereto without departing from the spirit and scope of the invention as set forth in the hereafter appended claims.

What is claimed is:

1. A GAP-specific DECT cordless telecommunications system with assured interoperability of cordless telecommunications applications, comprising:
    (a) a cordless base station having a quantity k of parallel telecommunications channels;
    (b) a quantity m1 of first cordless mobile parts capable of communication with the base station and which respond and react only to connectionless call messages;
    (c) a quantity m2 of second cordless mobile parts capable of communication with the base station and which respond and react only to connection-based call messages;
    (d) a quantity m3 of third cordless mobile parts capable of communication with the base station and which respond and react to both connection-based call messages and connectionless call messages, wherein m1+m2+m3=m total number of cordless mobile parts, and m is >k such that the total number of cordless mobile parts is greater than the number of parallel telecommunications channels; and
    (e) a controller in the base station for controlling connections between the base station and all of the total cordless mobile parts wherein the controller sends a number j connection based call messages and a number i connectionless call messages, such that:
    (1) m=m1+m2+m3, in which case m1, m3$\geq$0 and m, m2$\geq$1, wherein there may be at least zero first cordless mobile parts, there may be at least zero third cordless mobile parts, there is at least one second cordless mobile part, and there is at least one total cordless mobile parts;
    (2) m2$\leq$k−1, in which case k$\geq$2, wherein there are at least two channels in the base station;
    (3) j$\leq$k−1, in which case k$\geq$2, wherein the number of connection-based call messages sent by the controller is less than the number of channels such that at least one channel is reserved for connectionless call messages.

2. A GAP-specific DECT cordless telecommunications system as claimed in claim 1, wherein the number k of parallel telecommunications channels at the cordless base station is equal to 12.

3. A GAP-specific DECT cordless telecommunications system as claimed in claim 1, wherein the number k of parallel telecommunications channels at the cordless base station is equal to 6.

* * * * *